Oct. 11, 1955  B. WATANABE  2,720,071

POWER GRASS LIFTER AND MOWER

Filed Feb. 9, 1953                                    2 Sheets-Sheet 1

INVENTOR
*Bunzo Watanabe*

BY
ATTORNEYS

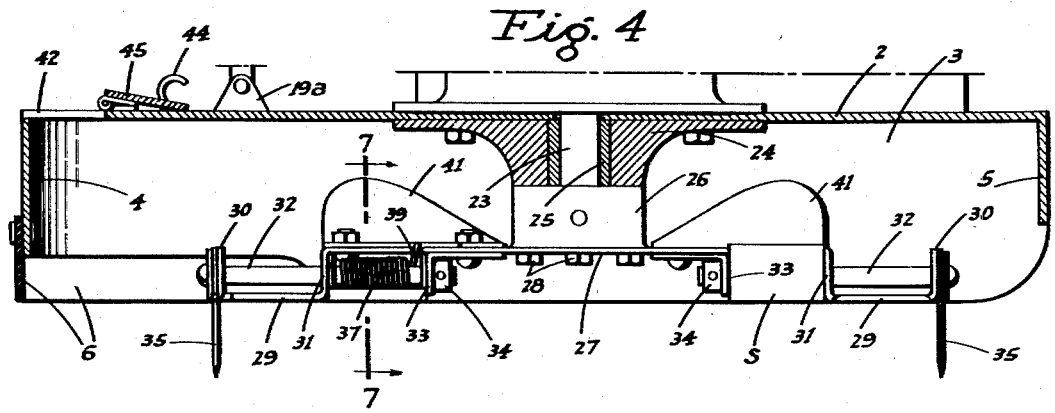
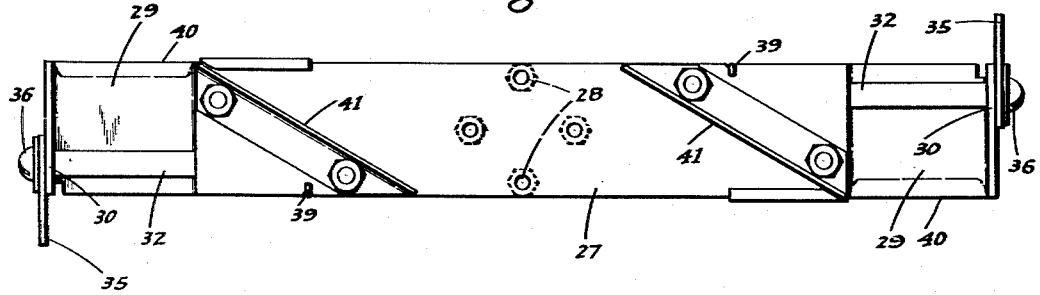
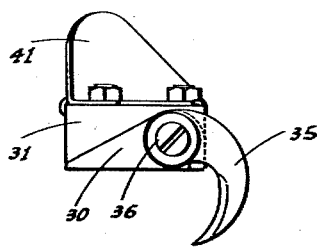
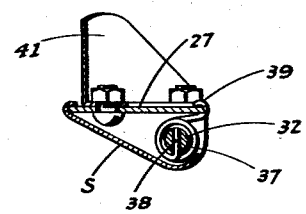
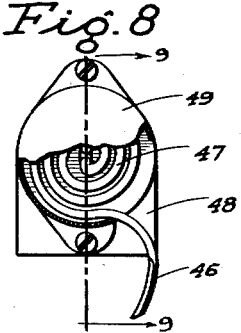
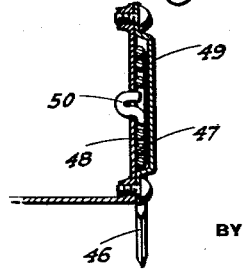
INVENTOR
Bunzo Watanabe United States Patent Office 2,720,071
Patented Oct. 11, 1955

2,720,071

POWER GRASS LIFTER AND MOWER

Bunzo Watanabe, Auburn, Calif.

Application February 9, 1953, Serial No. 335,911

11 Claims. (Cl. 56—25.4)

The present invention is directed to, and it is a major object to provide, improvements in a power mower for lawns, and particularly a mower of the type which includes a vertical axis, high-speed rotary blade disposed within a shallow bottomless protective housing; the latter being wheel-supported from the ground.

Another important object of the invention is to provide an improved rotary blade for a mower, as above; such blade including cutter or rooter teeth at the ends thereof for the purpose of rooting up and cutting off the low growing runners of Bermuda grass or the like simultaneously with operation of the mower to mow the upstanding grass.

Another object of this invention is to provide a grass mowing blade with runner uprooting and cutter teeth at the ends of said blade, as in the preceding paragraph, wherein such teeth are mounted for yielding motion contra to the direction of rotation, whereby to prevent breakage of such teeth upon striking foreign objects, such as sticks or stones; there being a novel spring assembly yieldably resisting such motion of the rooter teeth.

An additional object of the invention is to provide the rotary blade with fan vanes disposed to create an air blast in the housing in a manner to cause the cuttings to deliver through an opening in the housing into a connected receiving bag.

A further object of the invention is to provide a novel adjustable mount for the supporting wheels of the mower whereby the latter may be adjusted to properly position the rotary blade a proper distance above ground.

It is also an object of the invention to provide a power mower, including the rotary blade therefor, which is designed for ease and economy of manufacture.

Still another object of the invention is to provide a practical and reliable power mower, and rotary blade therefor, which will be exceedingly effective for the purpose for which it is designed.

These objects are accomplished by means of such structure and relative arrangement of parts as will fully appear by a perusal of the following specification and claims.

In the drawings:

Fig. 4 is an enlarged fragmentary central longitudinal section of the protective housing showing the novel rotary blade.

Fig. 5 is an enlarged bottom plan of said blade.

Fig. 6 is an enlarged end view of the blade.

Fig. 7 is a cross section of the blade on line 7—7 of Fig. 4.

Fig. 8 is an enlarged outer end elevation showing a modified mounting arrangement for each rooter tooth; the view being partly broken away and partly in section.

Fig. 9 is a vertical transverse section on line 9—9 of Fig. 8.

Figure 1:
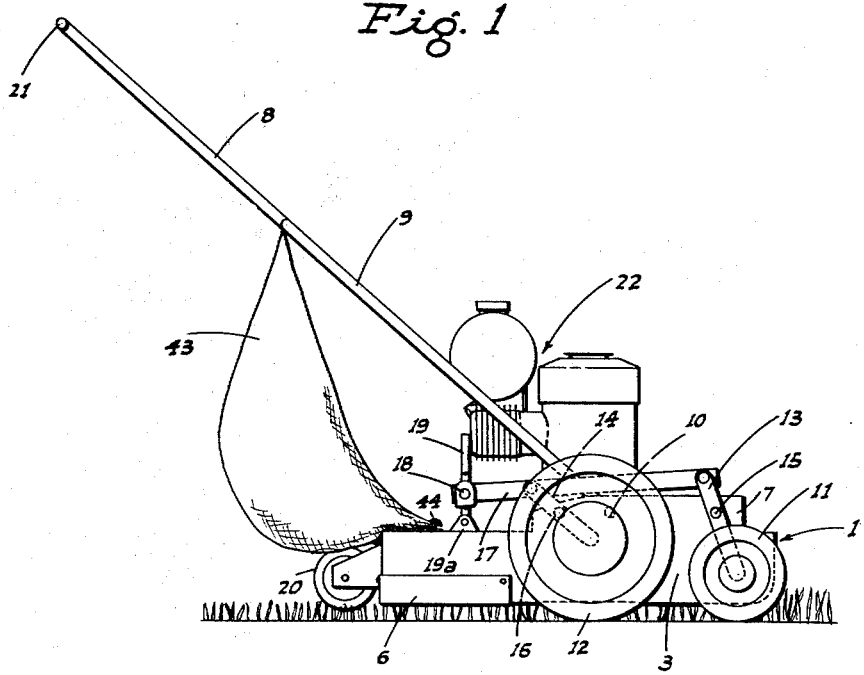
Fig. 1 is a side elevation of the power mower which embodies the present invention.
Figure 2:
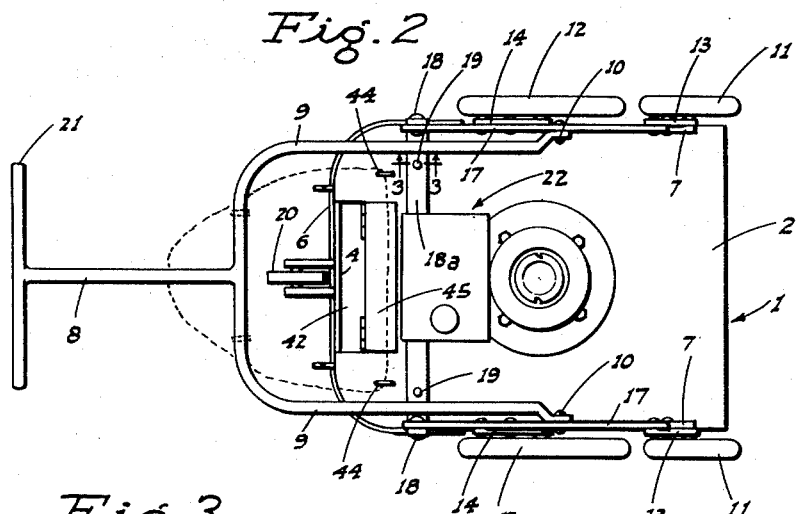
Fig. 2 is a plan view of the same.
Figure 3:
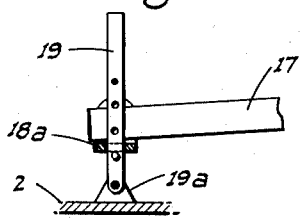
Fig. 3 is a fragmentary enlarged cross section on line 3—3 of Fig. 2.

Referring now more particularly to the characters of reference on the drawings, and at present to the embodiment of Figs. 1–7 inclusive, the power mower comprises a shallow bottomless protective housing 1 which is disposed generally horizontal, and which includes a flat top plate 2, side plates 3, a rear plate 4, and a front plate 5. The front plate 5 is of reduced depth to permit of ready entry of the grass into the housing 1 as the mower advances, while the rear portions of the side plates 3, together with the rear plate 4, are likewise of reduced depth, but include depending resilient skirts 6 to permit of the engagement and riding over of obstructions.

The side plates 3 include upward extensions 7, and a push bar 8 extends from rearwardly and above the housing 1 at a forward and downward incline; such push bar 8 being forked, as at 9, with the forks pivoted to the extensions 7 intermediate the ends of the latter, as at 10.

Longitudinally spaced wheels 11 and 12 are disposed at opposite sides of the housing 1 and are journaled on the lower ends of upstanding, corresponding links 13 and 14; the latter being pivoted intermediate their ends to the extensions 7, as at 15 and 16, respectively.

A longitudinal tie rod 17 is pivotally connected to the upper ends of each pair of the links 13 and 14, and thence extends rearwardly therefrom. At their ends both rods 17 are pivoted, as at 18, on a cross bar 18a, through which upstanding posts 19 slidably project. These posts are pivoted, at their lower ends, on brackets 19a mounted on the plate 2, so that upon adjustment of the cross bar up and down on the posts 19, the described linkages cause relative vertical adjustment between the wheels 11 and 12 and the housing 1; this for the purpose of properly disposing the rotary blade—hereinafter described—in its height above the ground. At the rear end of the housing 1 it includes a small central rear or pilot wheel 20.

The push bar 8 is formed, at its upper end, with a cross handle 21 to permit of rearwardly pushing and manipulation of the mower.

A gasoline engine unit, indicated generally at 22, is mounted on the top plate 2 substantially centrally thereof, and includes a vertical, downwardly projecting drive shaft 23 which projects into the housing 1 through a flanged bearing block 24 bolted, as shown, to the top plate 2, and including a bushing 25 through which the shaft extends.

A hub 26 is secured to the shaft 23 below the bearing block 24. A flat but elongated rotary blade 27 is secured, centrally of its ends, to the bottom of the hub 26 by bolts 28; such blade radiating a substantial distance from opposite sides of said hub.

The outer ends 29 of the rotary blade 27 are of upwardly opening U-shape, each including an outer ear 30 and an inner ear 31.

A radial shaft 32 is journaled in, and extends through, the ears 30 and 31 at each end of the rotary blade 27, extending some distance inwardly from the ear 31 and there passing through another ear 33 which depends from said blade 27. At its inner end—i. e. inwardly of the ear 33—each shaft 32 carries a collar 34. At the outer end thereof—i. e. outwardly of the ear 30—each shaft 32 is fitted, in non-turnable relation, with a hook-shaped rooter tooth 35 which depends some distance below the adjacent U-shaped end 29, and faces in the direction of rotation.

Each rooter tooth 35 is secured to the corresponding shaft 32 by means which includes an end screw 36. A helical torque spring 37 surrounds each shaft 32 between the ears 31 and 33, one end of such spring being anchored to the shaft, as at 38, while the other end of the spring is anchored to the blade 27, as at 39, Each spring 37 normally maintains the related rooter tooth 35 in dependent position, but should such tooth strike a foreign object, the tooth may yield rearwardly against the torque of the spring, thus preventing damage to the tooth, which might otherwise occur.

Both of the rooter teeth 35 are sharpened on their leading edges, as shown, while the leading edges of the U-shaped ends 29 of the rotary blade 27 are likewise sharpened, as at 40.

In order to protect the springs 37 from damage due to striking foreign objects, the blade 27 is fitted, ahead of each spring and below the same, with a shield S.

When the above described mower is in operation, the blade 27 is rotated at high speed; the sharpened leading edges 40 of the U-shaped ends 29 effectively mowing a swath along the grass as the mower is advanced.

At the same time the rooter teeth 35 at the ends of the rotary blade 27 dig slightly into the turf and uproot the low growing runners of Bermuda grass or the like. Such runners, upon being uprooted, are effectively cut or chopped either by the teeth 35 or by the sharpened leading edges 40 of the blade 27. In this way the mower is operative not only to mow the grass, but also to uproot and comminute the undesirable runners of Bermuda grass or the like.

The rotary blade 27 is fitted on top thereof, and radially out from the axis, with diagonal upstanding vanes 41; such vanes creating an air blast within the housing 1, which air blast picks up and sweeps the cuttings rearwardly in the housing and thence out of an opening 42 in the top plate 2 at the rear.

From the opening 2 the cuttings pass with the air blast into a cuttings receiving bag 43 suspended from the push bar 8 and having a throat in communication with the opening 42; the bag being maintained in proper position over the opening 42 by engaging the bag with hooks 44 which upstand from the top plate 2 beyond the ends of such opening 42.

Under certain operating conditions it is not desired to catch or accumulate the cuttings, in which event the bag 43 is removed and the opening 42 is closed by a hinged trap door 45.

In Figs. 8 and 9 there is illustrated a modified mount for the rooter teeth, one of which is indicated at 46. Each such rooter tooth 46 is formed as an extension of the outer end of a coil type torque spring 47 disposed with its axis radial to that of the rotary blade 27; the outer ear of the latter being here indicated at 48. Each coil spring 47 is maintained in a circular protective cover 49 attached to the face of the ear 48, but having a slot, as shown, to permit the rooter tooth 46 to extend outwardly and downwardly to working position, and to yield when necessary contra to the direction of rotation of the rotary blade 27. The coilspring 47 is non-turnably anchored at the center to the ear 48, as at 50.

With this mounting of each rooter tooth 46, the tooth functions in the same manner as each rooter tooth 35, but here the mounting is somewhat simplified.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A rotary, vertical axis lawn mower blade unit, comprising an elongated blade adapted for center mounting, said blade having sharpened opposed leading edge portions, a rooter tooth depending from the blade at the outer end of each such sharpened portion thereof, and means securing each rooter tooth on the blade.

2. A blade unit, as in claim 1, in which each rooter tooth is generally hook-shaped, faces in the direction of rotation, and is sharpened on its leading edge.

3. A rotary, vertical axis lawn mower blade unit, comprising an elongated blade adapted for center mounting, said blade having sharpened opposed leading edge portions, a rooter tooth depending from the blade at the outer end of each such sharpened portion thereof, means securing each rooter tooth on the blade for rearward swinging motion about an axis radial of that of the blade, and means yieldably resisting such swinging motion.

4. A rotary, vertical axis lawn mower blade unit, comprising an elongated blade adapted for center mounting, said blade having sharpened opposed leading edge portions, a rooter tooth depending from the blade at the outer end of each such sharpened portion thereof, a radial shaft journaled on the blade above each edge portion and to which the tooth is secured, and a helical torque spring surrounding each shaft and connected between the same and the blade.

5. A rotary, vertical axis lawn mower blade unit, comprising an elongated blade adapted for center mounting, said blade having sharpened opposed leading edge portions, a rooter tooth depending from the blade at the outer end of each such sharpened portion thereof, a vertical ear on the blade adjacent each rooter tooth, and a radial axis, helical coil spring disposed in adjacent facing relation to each ear; the inner end of the spring being non-turnably secured to the ear and the outer end of the spring being integral with the related rooter tooth.

6. A blade unit, as in claim 5, in which each ear includes a protective cover thereon over the spring; the cover having a slot through which the outer end of the spring extends.

7. A rotary, vertical axis lawn mower blade unit, comprising an elongated blade adapted for center mounting, each blade having an upwardly opening U-shaped end and each such end being sharpened on the leading edge of the bottom portion thereof, a radial shaft journaled in and extending outwardly from each shaped end of the blade, a rooter tooth fixed on the outer end of each shaft and depending therefrom to a point in a horizontal plane below the adjacent sharpened edge, and spring means yieldably resisting rotation of each shaft in a direction which permits of rearward swinging of the related rooter tooth.

8. A blade unit, as in claim 7, in which each shaft extends inwardly of the corresponding U-shaped end of the blade, projecting below the blade; and said last named means comprises a helical torque spring surrounding said projection of each shaft, with the spring anchored at one end thereto and anchored at the other end to the blade.

9. A rotary, vertical axis lawn mower blade unit, comprising an elongated blade member adapted for center mounting, radially extending portions sharpened along their leading edges projecting from the ends of and below the level of said member, and air impeller vanes upstanding from the member adjacent its ends and disposed diagonally of said edge portions; the mower including a relatively fixed housing in which the blade unit turns and having an opening for communication with a cuttings receiving bag and to which opening the vanes direct the grass as cut.

10. In a lawn mower of the type which includes a rotary, vertical axis mower blade unit, a bottomless housing over the unit including a substantially flat top plate and depending plates about the sides and rear end of the top plate, the top plate having an opening thereon at its rear end, the blade unit having air impeller blades to direct cuttings toward the opening, hooks on the top plate adjacent the front of the opening and to the sides thereof, and a cuttings-receiving bag to receive from the opening and arranged to detachably engage the hooks in locating relation.

11. A structure, as in claim 10, with a trap door mounted on the top plate to close the opening therein when the bag is disengaged from the hooks.

References Cited in the file of this patent

UNITED STATES PATENTS

| | | |
|---|---|---|
| 2,529,870 | Golasky | Nov. 14, 1950 |
| 2,571,455 | Keiper | Oct. 16, 1951 |
| 2,619,891 | Sloper | Dec. 2, 1952 |

FOREIGN PATENTS

| | | |
|---|---|---|
| 514,189 | Great Britain | Nov. 1, 1939 |